April 1, 1958 W. E. POHL 2,829,194

REPRODUCING COLOR TELEVISION

Filed March 31, 1953

Inventor
Wadsworth E. Pohl
by Roberts, Cushman & Grover
Attys.

United States Patent Office 2,829,194

Patented Apr. 1, 1958

2,829,194

REPRODUCING COLOR TELEVISION

Wadsworth E. Pohl, Los Angeles, Calif., assignor to Technicolor Corporation, Hollywood, Calif., a corporation of Maine Application March 31, 1953, Serial No. 345,829

4 Claims. (Cl. 178—5.4)

This invention relates to a method and apparatus for making a record of a color picture such as a color television image and reproducing electrical signals from the record.

In modern color television or facsimile broadcasting it is frequently desired to record a program in color simultaneously with an original broadcast to one time zone, and rebroadcast the same program a short time later to another time zone. Hitherto it has been necessary to record the program on color film and then proceed with lengthy color development. Despite the advance of commercial color film processes, these processes are still expensive and at the present the development of a good color print within an hour's time is a virtual impossibility.

Accordingly, one object of the present invention is to provide a method of reproducing a color picture which is far less expensive than color processes and which eliminates the necessity of color development.

In a broad aspect the invention involves the production of two or more separate color signals from a monochrome record such as a black and white silver record in which there are at least two color aspects or components, each aspect having a plurality of picture elements, i. e., small sub-elements, disposed in a predetermined pattern, the signals being produced by the method which comprises scanning the record with a light beam, splitting the scanning beam into a plurality of beams, and occulting at least one of the split beams in a pattern corresponding to the element pattern of said one aspect. The scanning beam is modulated by all of the color aspects of the record, and by occulting is meant that portions of the beam are darkened, or that only those portions corresponding to one aspect are transmitted for conversion to electrical signals.

In this application the term "aspect" is used to refer to the separate color picture portions of a record whether the portions are actually colored or not. For example, in certain steps of color picture reproduction there may be a record or image representing in black and white the red portion of a picture. Such record is commonly called the red aspect record or image to distinguish it from a record or image actually colored red. Thus a single, plural-aspect record is a single record carrying a plurality of color aspects.

While the element pattern may be determined in the record during exposure thereof, preferably it is predetermined by the original picture, that is a television image or a color record which may or may not be colored so long as it has a plurality, two, or more, color aspects, each aspect having a plurality of picture elements arranged in a predetermined pattern. Thus, in a further aspect the method comprises printing the image on a photosensitive record, preferably a silver halide film, and developing the record in only one color. With silver halide film the color will be black and white although any monochromatic development is satisfactory.

From the foregoing it is apparent that the monochrome record may be printed and developed by any one of many widely varying photographic processes. While it is possible to scan the record and to occult a record modulated beam manually, it is, of course, preferable to employ electronic apparatus and accordingly I disclose as another aspect of my invention the apparatus which I prefer for producing color picture signals from a plural aspect monochrome record having a predetermined element pattern. In a broad aspect the apparatus comprises a scanning aperture for the record, a scanner, for example a flying spot, for scanning the aperture with a light beam thereby to modulate distinct portions of the beam according to the aforesaid plural color aspects, a photoelectric device responsive to light variations to produce a corresponding electrical signal, optical means for directing the modulated beam on a path to the device, and a mask in said path having a light transmitting pattern corresponding to the predetermined element pattern of the record, the mask being disposed relatively to the path so that beam portions corresponding to one aspect only are transmitted to the photoelectric device, whereby the device produces signals corresponding to only one color aspect of the monochrome record.

Preferably two, or more, photoelectric devices are used, and the beam split are directed along two or more paths, a mask in each path transmitting only one aspect portion of the beam to a photoelectric device.

For the purpose of illustration typical embodiments of the invention are illustrated in the accompanying drawing Fig. 1 is a diagrammatic view showing the printing of a record according to the present invention;

Figure 1:
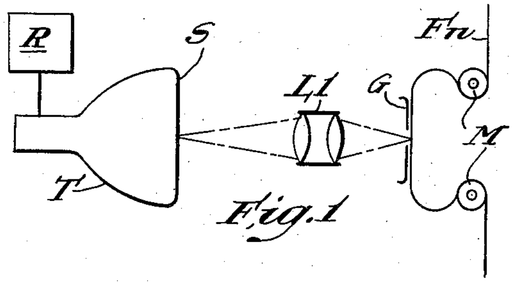
Figure 6:
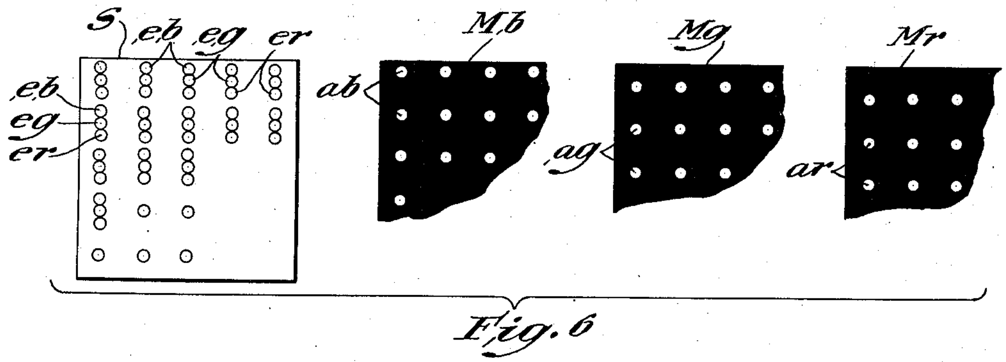
Fig. 6 is a plan view showing the relation between a television screen and the masks.
Figure 5:
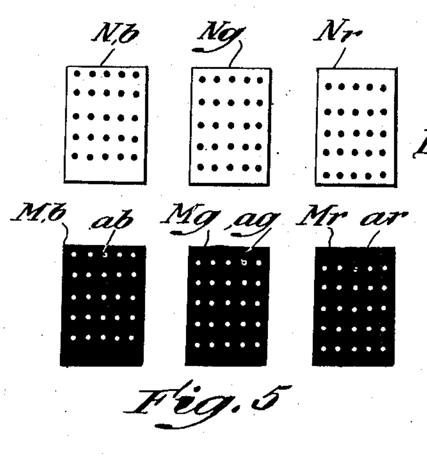
Fig. 5 is a plan view showing a further step in the preparation of a mask.
Figure 3:
Fig. 3 is a diagrammatic view showing the occulting of a scanning beam.

Fig. 1 illustrates the preferred method of preparing a monochrome plural aspect record from a television image. The image is displayed on the screen S of a television picture tube T to which color video signals and sweep voltages are fed from a receiver R. The face of the screen S (Fig. 6) has a plurality of fluorescent elements *eb, eg, er* arranged in a pattern in which the elements representing one color aspect are spaced from those representing another color aspect. The elements may be fluorescent in different colors as disclosed in U. S. Patent No. 2,611,099 to Jenny, or they may all emit the same color light. The image on the screen S is projected on photosensitive negative film stock F*n* by a suitable lens L1. The film F*n* is fed through a gate G by feed mechanism M. In accordance with well known practice the film may be fed continuously or intermittently, the sweep voltages supplied by the receiver R being controlled accordingly. In either case there will be copied on the film F*n* a negative record of the momentary image on the screen S, the various color aspects of the image being differentiated by a pattern and spacing corresponding to the elements *eb, eg, er* of the screen S. Thus if a screen S, such as that shown in Fig. 6, is used the record on the film F*n* will be comprised of a plurality of spots. However, a screen such as that shown in U. S. Patent No. 2,618,759 to Hoyt may be used, in which case the record on the film F*n*, or on a positive F*p* printed therefrom, will comprise a plurality of parallel banded recording areas *rb, rg, rr* as shown in Fig. 3. While the spaced recording areas or elements *rb, rg* and *rr* represent different color aspects, it should be understood that the negative film stock F*n* is monochromatic, preferably silver halide stock and that each of the record elements is developed in the same color. With silver halide stock the record on the negative F*n* is developed by any good silver developing method. If tube T is displaying a color picture then the three leader sections in the first few feet of the film F*n* are, for reasons to be explained, exposed respectively through blue, green and red filters so that in each leader section only one color aspect is recorded in an unmodulated pattern such as is shown in Fig. 5. The color program appearing on the screen S is then recorded. A positive record F*p* is printed from the record F*n* and developed in any conventional manner.

Figure 2:
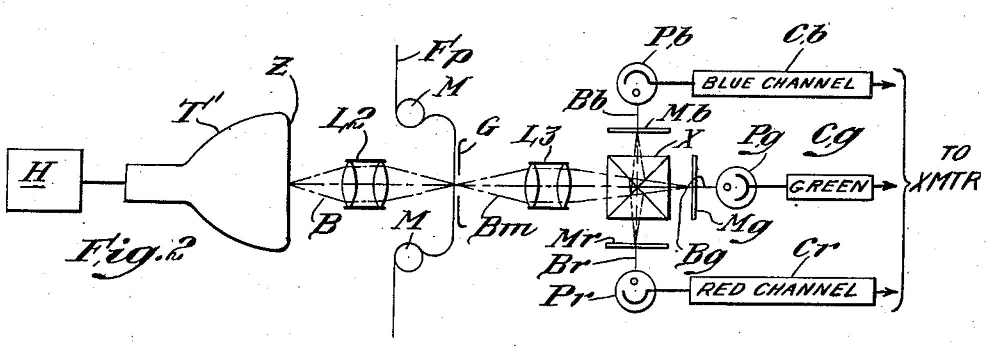
Fig. 2 is a diagrammatic view showing the scanning of the record.

In Fig. 2 is illustrated a way in which separate electrical signals may be derived from the positive monochrome record F*p*. The record F*p* is fed through a gate or aperture G by intermittent or continuous mechanism M as in the case of the recording step illustrated in Fig. 1. The aperture G is scanned by a flying spot on the screen Z of a cathode ray tube T' whose deflection voltages are supplied from a sweep generator H adapted to the continuous or intermittent feed of the mechanism M. The flying spot on the screen Z is projected in a beam B by a lens L2 through the aperture G. After passing through the film in the aperture the beam B*m* is modulated according to the successive record elements *rb*, *rg* and *rr*. An objective lens L3 directs the modulated beam B*m* on a beam splitting device X. This device, well known as an X- or cross prism, splits the modulated beam B*m* into three beams respectively directed toward three photoelectric tubes P*b*, P*g* and P*r*. Interposed between the X prism or photoelectric tubes are three masks M*b*, M*g* and M*r*. Each of these masks, which will be explained more fully hereinafter, has a plurality of light transmitting apertures *ab*, *ag*, *ar* (Fig. 6) or *a'b*, *a'g*, *a'r* (Fig. 3) arranged in a pattern which corresponds to the element pattern of the television screen S and the record pattern of the negative and positive films F*n* and F*p*. As shown fragmentarily in Fig. 6 the masks M'*b*, M'*g* and M'*r* are disposed in the respective paths to the three phototubes so that they occult portions of the modulated beam B*m* and transmit a portion corresponding to only one of the color aspects of the record F*p* to each phototube. Thus, each phototube produces an electrical signal corresponding to one aspect only of the record. This single color aspect signal is amplified in the well known blue, green and red channel C*b*, C*g* and C*r* associated with a television transmitter.

Figure 4:
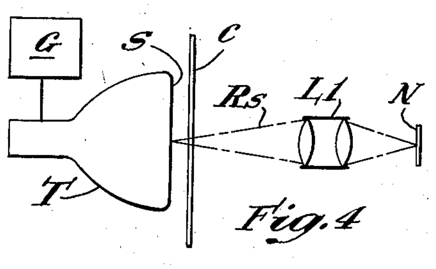
Fig. 4 is a diagrammatic view illustrating one step in the preparation of a beam occulting mask.

Figs. 4, 5 and 6 illustrate a preferred method of preparing the masks M*b*, M*g* and M*r*. As shown in Fig. 4 a single frame negative photosensitive film N is exposed through suitable optics L1 to the raster on the face of a screen S of a television tube T, preferably the same tube T as is shown in Fig. 1 for printing the monochrome records used for projection. The screen may be comprised of the different color elements shown on the screen S in Fig. 6 or bands like the record elements *rb*, *rg* and *rr* shown on the positive film F*p* in Fig. 3. As previously suggested in connection with the color elements on the screen S of Fig. 2 they may fluoresce in different colors, or preferably in the same color. The tube T is fed with sweep voltages and an unmodulated intensity signal so that a raster of uniform intensity appears on the screen S. According to standard practice the elements representing the different aspects will be scanned by three successive or simultaneous sweeps or rasters. If the elements emit different colored lights a filter C of one of the colors is interposed between the screen S and the negative stock N whereby the distinctive pattern of one of the color elements is printed on the negative stock. For example if a blue filter is used the pattern of the blue elements *eb* will be printed on the negative stock in the same spacial relationship as they appear on the screen S. Additional negatives are printed using a green filter and a red filter, whereby patterns of the green elements *eg* and red elements *er* of the screen S respectively will be printed on separate negative frames.

If the elements of the screen are all emissive of the same color the filter C may be eliminated by scanning the screen with only one of the three successive or simultaneous sweeps or rasters at one time. This method may be used with differently emissive elements also.

From the three negatives N*b*, N*g* and N*r* are printed the three masks M*b*, M*g* and M*r*. Each of these masks will have an opaque field with transparent areas or apertures *ab*, *ag* and *ar* respectively corresponding to the elements *eb*, *eg* and *er* of the screen S, and arranged in the same pattern as these elements as shown in Fig. 6. The masks M*b*, M*g* and M*r* are adjusted in the same optical relation to the record F*p* as shown in Fig. 3 and suggested in Fig. 6. The leader sections previously referred to are used in adjusting the masks in the desired optical relation to the phototubes. Preliminary to rebroadcasting the record F*p*, these sections are scanned separately and the corresponding mask adjusted for maximum output from the corresponding phototube.

From the foregoing it is apparent that the negative and positive records F*m* and F*p* may be printed and developed in silver regardless of whether the screen S of Fig. 1 has colored or monochrome fluorescent elements, and that the separate television signals used to scan the screen S may be reproduced and the three color aspect signals rebroadcast either sequentially or simultaneously without the necessity of any color record being made.

Furthermore for the scanning process illustrated in Fig. 2 the fluorescent material used on the screen Z of the flying spot scanner T' may be chosen relative to the sensitivity of the phototubes P*b*, P*g* and P*r* for the most efficient operation of the phototubes and without compensating for variation in phototube sensitivity to different colors.

It should be understood that the invention is not limited to a specific dot or banded element pattern and the elements of the original picture may be either of the multicolor or the monochrome type. Preparation of the multiaspect record is not confined to any particular printing or developing technique although I have described one for the purpose of illustration. This invention includes all modifications and equivalents which fall within the scope of the appended claims.

I claim:

1. For producing a color picture signal from a single monochrome record having a plurality of color aspects, one aspect comprising picture elements arranged in a predetermined pattern, apparatus comprising a scanning aperture for said record, means for scanning said aperture with a light beam to modulate distinct portions of the beam according to said color aspects respectively, a photoelectric device responsive to light variations to produce a corresponding electrical signal, optical means for projecting the modulated beam along a path to said device, and a stationary mask in said path having a light transmitting pattern corresponding to said predetermined pattern, said mask being disposed relatively to said path so that said light transmitting pattern passes only beam modulations in a portion of the beam corresponding to said one color aspect, whereby the photoelectric device produces signals corresponding to only one color aspect of said record.

2. For producing a color picture signal from a single monochrome record having a plurality of color aspects, one aspect comprising picture elements arranged in a predetermined pattern, apparatus comprising a scanning aperture for said record, means for scanning said aperture with a light beam to modulate distinct portions of the beam according to said color aspects respectively, a photoelectric device responsive to light variations to produce a corresponding electrical signal, optical means for projecting the modulated beam along a path to said device, and a stationary mask in said path having light transmitting elements arranged in a pattern corresponding to said predetermined pattern, said mask being disposed relatively to said path so that said elements pass only beam modulations in a portion of the beam corresponding to said one color aspect, whereby the photoelectric device produces signals corresponding to only one color aspect of said record.

3. For producing a color picture signal from a single monochrome record having two color aspects, each aspect comprising picture elements arranged in a predetermined pattern, apparatus comprising a scanning aperture for said record, means for scanning said aperture with a light beam to modulate distinct portions of the beam according to said color aspects respectively, two photoelectric devices responsive to light variations to produce a corresponding electrical signal, optical means for projecting the modulated beam along separate paths to said devices respectively, and a stationary mask in each of said paths having a light transmitting pattern corresponding to one of said predetermined patterns, each of said masks being disposed relative to its path so that said light transmitting pattern passes only beam modulations in a portion of the beam corresponding to one of said color aspects, whereby each photoelectric device produces signals corresponding to a different color aspect of said record.

4. For producing a color picture signal from a single monochrome record having two color aspects, each aspect comprising picture elements arranged in a predetermined pattern, apparatus comprising a scanning aperture for said record, means for scanning said aperture with a light beam to modulate distinct portions of the beam according to said color aspects respectively, two photoelectric devices responsive to light variations to produce a corresponding electrical signal, optical means for splitting and projecting the modulated beam along two separate paths to said devices respectively, and a stationary mask in each of said paths having light transmitting elements arranged in pattern corresponding to one of said predetermined patterns, said masks being disposed relative to their respective path so that said light transmitting elements respectively passes beam modulations corresponding to different color aspects, whereby each photoelectric device produces signals corresponding to only one color aspect of said record.

References Cited in the file of this patent

UNITED STATES PATENTS

| | | |
|---|---|---|
| 2,531,031 | France | Nov. 21, 1950 |
| 2,594,715 | Angel | Apr. 29, 1952 |
| 2,600,868 | Hales | June 17, 1952 |
| 2,607,845 | Clark | Aug. 19, 1952 |
| 2,736,762 | Kell | Feb. 28, 1956 |